United States Patent [19]

Nakamura et al.

[11] 4,364,429

[45] Dec. 21, 1982

[54] AUTOMATIC TEMPERATURE CONTROL SYSTEM FOR VEHICLE AIR CONDITIONERS

[75] Inventors: Yukinobu Nakamura, Asaka; Tsuneo Nakajima, Kawagoe; Toru Atsumi, Kamifukuoka; Kunitaka Sakai, Asaka, all of Japan

[73] Assignee: Honda Giken Kogyo Kabushiki Kaisha, Tokyo, Japan

[21] Appl. No.: 256,116

[22] Filed: Apr. 21, 1981

[30] Foreign Application Priority Data

Apr. 21, 1980 [JP] Japan .............................. 55-54325[U]

[51] Int. Cl.³ ...................... F25B 29/00; F25D 17/00
[52] U.S. Cl. ...................................... 165/28; 165/43; 62/179; 236/13
[58] Field of Search ................... 236/13, 916; 165/35, 165/43, 28; 62/179

[56] References Cited

U.S. PATENT DOCUMENTS 4,250,956  2/1981  Ohtani ................................... 165/36
4,289,195  9/1981  Bellot et al. .................... 236/916 X Primary Examiner—William E. Wayner
Attorney, Agent, or Firm—Irving M. Weiner; Pamela S. Burt; John L. Shortley

[57] ABSTRACT

An automatic temperature control system for a vehicle air conditioner including a cool air supply mechanism having an air flow control device, an air flow dividing device for dividing a cool air flow supplied from the cool air supply mechanism into a primary flow and a secondary flow, a heat source for heating the primary flow, and a mixing mechanism for mixing the primary flow as warmed past the heat source, and the secondary air which remains cool, with each other. The control system comprises a first circuit for sensing for output as a first signal an air temperature within the interior of a vehicle, a second circuit for sensing for output as a second signal an air temperature outside the vehicle interior, a third circuit for providing a third signal corresponding to a preset temperature, a fourth circuit interlocked with the flow dividing device so as to output as a fourth signal the flow-dividing ratio thereof, a fifth circuit for providing a fifth signal upon a comparison of the first signal with the third signal, a sixth circuit for providing a sixth signal upon a comparison of the second signal with the third signal, and a seventh circuit for providing a seventh signal to determine the mixing ratio of the primary flow and the secondary flow upon a comparison among the fourth, fifth and sixth signals, the air flow control device being controlled by the fifth signal, and the air flow dividing device being controlled by the seventh signal.

The automatic temperature control system is of low noise and adequately counteracts temperature changes within the vehicle interior.

10 Claims, 4 Drawing Figures

PRIOR ART

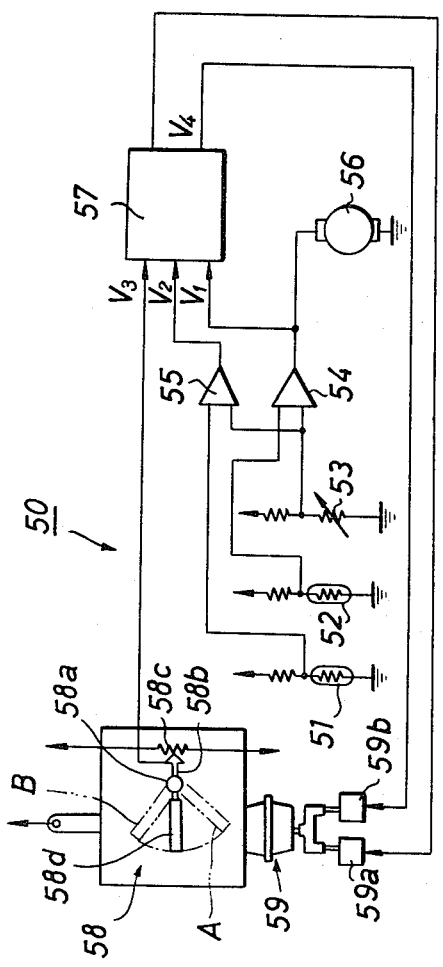
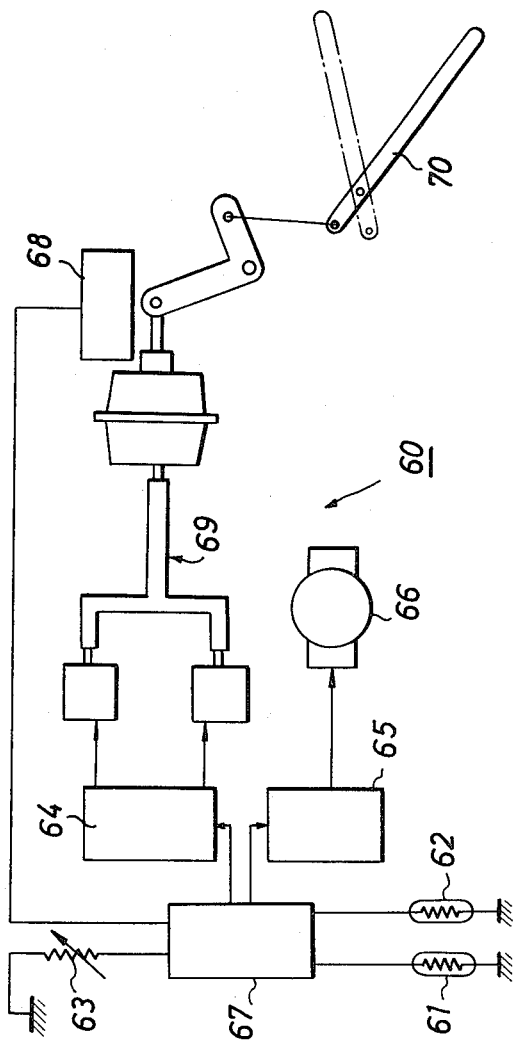
FIG. 3
FIG. 4

AUTOMATIC TEMPERATURE CONTROL SYSTEM FOR VEHICLE AIR CONDITIONERS

BACKGROUND OF THE INVENTION

1. Field of the Invention

The present invention relates to an automatic temperature control system for a vehicle air conditioner of the air-mix type, which has a low noise level and adequately counteract temperature changes within the interior of the vehicle.

2. Relevant Art

The air-mix type vehicle air conditioner generally comprises a cool air supply mechanism having an air flow control device, an air flow dividing device for dividing a cool air flow supplied from the cool air supply mechanism into a primary flow and a secondary flow, a heat source for heating the primary flow, and a mixing mechanism for mixing the primary flow, as warmed past the heat source, and the secondary flow, which remains cool, with each other.

Referring now to FIG. 1, there is schematically shown a typical example of such type of vehicle air conditioner 1, which is constituted of a cool air supply mechanism 2 having an air supply fan 6 functioning as an air flow control device for supplying through a cooling evaporator 8 an air flow introduced from either outside or inside the interior of a vehicle by a changeover operation of a damper 7, an air flow dividing device 3 such as a butterfly type air-mix damper for dividing a cool air flow supplied from the cool air supply mechanism 2 into a primary flow directed through a heating passage 9 and a secondary flow directed through a by-pass duct 10. Also provided is a heat source 4 such as a heat exchanger utilizing engine heat for heating the primary flow, and a mixing mechanism 5 for mixing the primary flow, as warmed past the heat source 4, and the secondary flow which remains cool, with each other. In this manner, flow conditioned at an adequate temperature is supplied into the vehicle room.

For such a vehicle air conditioner there has been adopted an automatic temperature control system including a circuit for detecting for output as a voltage level an air temperature within the interior of a vehicle, a circuit for detecting for output as a voltage level an air temperature outside the interior of the vehicle, and a circuit interlocked with the foregoing air flow dividing device for output as a voltage level the flow-dividing ratio thereof, in which a signal resulting from a comparison of the sum of those outputs with a reference voltage is used to control the foregoing air flow control device and the air flow dividing device interlocked therewith.

Referring now to FIG. 2, there is shown as an example such a conventional automatic temperature control system, in which an outside air temperature sensor 40, a vehicle room temperature sensor 41 and a potentiometer 42 interlocked with an air-mix damper (not shown) serving as the above air flow dividing device are connected in series to have the sum of their voltage outputs input to a controller 43 which in turn compares this sum with a voltage output of reference voltage circuit 44, thereby obtaining a signal to control an actuator 45 whereby the air-mix damper is moved as required. This damper is interlocked with a shaft 46a and also with a change-over rod 46 fixed for pivotal movement to the shaft 46a. The change-over rod 46 is provided at its one end with a contact piece 46b imparting an output voltage of the potentiometer 41 and at its another end with a changeover piece 46c selecting through a speed-change mechanism 49 the rotational speed of a driving motor 47 of an air supply fan (not shown) serving as the aforesaid air flow control device. By virtue of the pivotal movement of the change-over rod 46, the sum of voltage outputs of the sensors 40, 41 and the potentiometer 42, i.e., a voltage obtained by sharing a voltage difference from a power line +B to the earth E between the sum of resistances of the elements 40, 41, 42 and a temperature-setting variable resistance 48 is balanced with the above reference voltage, thereby positioning the air-mix damper and at the same time providing a corresponding driving voltage to the motor 47 to thus control the speed of rotation thereof.

In the conventional automatic temperature control system, however, the input from the outside is fed as the sum of the voltage output of the room temperature sensor and that of the outside air temperature sensor, so that, even when there is such an extent of changes in the outside air temperature as requires no operation of the air supply fan since the interior of the vehicle is at a substantially suitable temperature, the air supply fan responds to each of those changes. In other words, the operation of the air supply fan becomes more frequent, which is undesirable from the standpoint of noise control.

Moreover, in the conventional system, since the air flow dividing device and the speed-change mechanism of the motor are interlocked with each other, the supply fan is operated at every control of the air flow dividing device, thus resulting in a further increase in noise.

Furthermore, in the conventional system, the sum of the voltage output of the room temperature sensor, that of the outside air temperature sensor, and that of the potentiometer representing the flow-dividing ratio is compared with the reference voltage, so that minor errors in the actual operation of each detection circuit overlap in the comparison with the reference voltage, which is undesirable from the standpoint of circuit stability.

SUMMARY OF THE INVENTION

The present invention solves the aforesaid problems in an effective manner.

Therefore, it is an object of the present invention to provide an automatic temperature control system for a vehicle air conditioner of the air-mix type, which does not supply cool air when an extent of changes in the outside air temperature requires no supply of cool air since the interior of a vehicle is at a substantially suitable temperature, thus reducing the noise due to the air supply operation.

It is another object of the present invention to provide an automatic temperature control system for a vehicle air conditioner of the air-mix type capable of adequately counteracting changes in temperature within a vehicle room by separately controlling an air flow control device and an air flow dividing device, thus further reducing the noise.

It is a further object of the present invention to provide an automatic temperature control system for a vehicle air conditioner of the air-mix type capable of favorably preventing the overlapping of minor errors in actual operations of a circuit for sensing for output as a signal an air temperature within the interior of a vehicle, a circuit for sensing for output as a signal an outside air temperature and a circuit interlocked with an air flow dividing device for sensing for output as a signal the flow-dividing ratio thereof.

According to the present invention, therefore, there is provided an automatic temperature control system for a vehicle air conditioner including a cool air supply mechanism having an air flow control device, an air flow dividing device for dividing a cool air flow supplied from the cool air supply mechanism into a primary flow and a secondary flow, a heat source for heating the primary flow, and a mixing mechanism for mixing the primary flow, as warmed past the heat source, and the secondary air, which remains cool, with each other. A first circuit is provided for sensing for output as a first signal an air temperature inside a vehicle, a second circuit for sensing for output as a second signal an air temperature outside the vehicle interior a third circuit for providing a third signal corresponding to a preset temperature, a fourth circuit interlocked with the flow dividing device for output as a fourth signal the flow-dividing ratio thereof, a fifth circuit for providing a fifth signal upon a comparison of the first signal with the third signal, a sixth circuit for providing a sixth signal upon a comparison of the second signal with the third signal, and a seventh circuit for providing a seventh signal to determine the mixing ratio of the primary flow and the secondary flow upon a comparison among the fourth, fifth and sixth signals, the air flow control device being controlled by the fifth signal, and the air flow dividing device being controlled by the seventh signal.

A preferred embodiment of the present invention is described below in detail with reference to the accompanying drawings, from which other objects and advantages of the present invention will become apparent.

BRIEF DESCRIPTION OF THE DRAWINGS

FIG. 3 illustrates a temperature control system for a vehicle air conditioner according to the present invention.

FIG. 4 is a block diagram showing a modification of the temperature control system illustrated in FIG. 3.

DETAILED DESCRIPTION OF THE INVENTION

Figure 1:
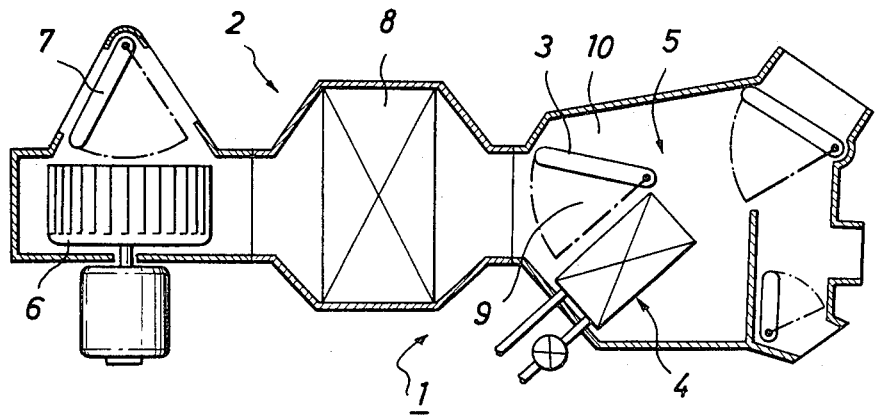
FIG. 1 shows a schematic typical example of a conventional vehicle air conditioner of the air-mix type.
Figure 2:
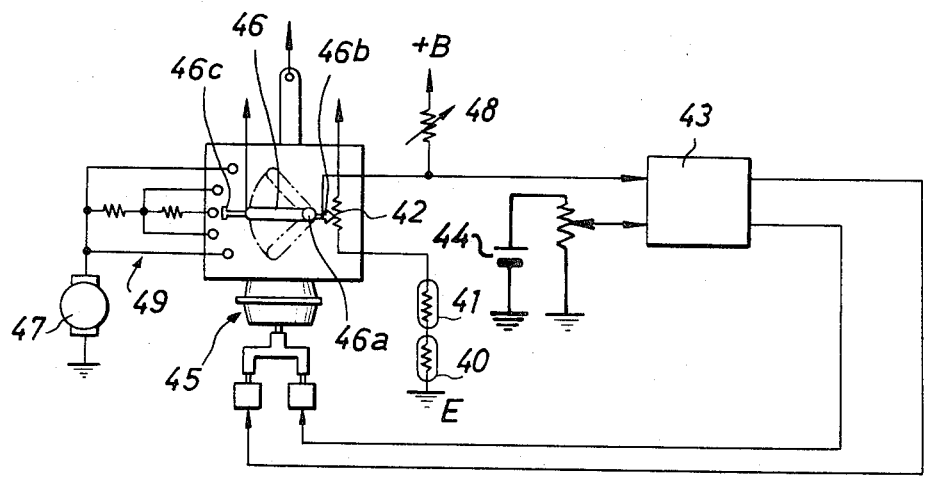
FIG. 2 is a circuit diagram of a conventional temperature control system for a vehicle air conditioner.

The circuit diagram shown in FIG. 3 is of a temperature control system adaptable for an air-mix type air conditioner as exemplified in FIG. 1.

In FIG. 3, there is shown a temperature control system 50 including an outside air temperature sensor 51 consisting of a thermo-sensitive resistor such as a thermistor, a vehicle interior temperature sensor 52, and a temperature setter 53 consisting of a variable resistance, in which a terminal voltage of the room temperature sensor 52 and a terminal voltage of the temperature setter 53 are input to a differential amplifier 54, while a terminal voltage of the outside air temperature sensor 51 and the terminal voltage of the temperature setter 53 are input to another differential amplifier 55, from which amplifiers are obtained output voltages $V_1$ and $V_2$ respectively corresponding to differences in the input voltages. The output voltage from the differential amplifier 54 is applied to a driving motor 56 of an air supply fan (not shown) in a cool air supply mechanism of an air conditioner and also to a comparative control circuit 57. On the other hand, the comparative control circuit 57 has as another input the output voltage from the differential amplifier 55 which is input as voltage signals with a preset temperature and an outside air temperature and outputs the difference therebetween as a voltage signal.

The comparative control circuit 57 is further fed as still another input with an output voltage of a potentiometer 58, which potentiometer has a contact piece 58b interlocked through a shaft 58a with an air-mix damper (not shown) serving as an air flow dividing device of the air conditioner, the contact piece 58b being slidable along a resistor 58c. The potentiometer 58 is provided with the above contact piece 58b at one end of an arm 58d pivotable about the shaft 58a in response to changes in position of the air-mix damper, thereby dividing a voltage across the resistor 58c to output to the comparative control circuit 57 a signal corresponding to the position of the air-mix damper, i.e. the flow-dividing ratio thereof. The arm 58d of the potentiometer 58 and the air-mix damper are pivotally moved interlockedly to their "Hot" side, i.e., the "A" side in FIG. 3, or to their "Cool" side, i.e., the "B" side in FIG. 3, by means of an actuator 59 which is provided with a pair of solenoids 59a and 59b adapted to operate in opposite directions to each other, and the corresponding output voltage is input to the comparative control circuit 57.

As mentioned above, voltage signals from the amplifiers 54, 55 and the potentiometer 58 are input to the comparative control circuit 57, which in turn compares a voltage value $V_1$ corresponding to the difference between the set temperature and the vehicle interior temperature plus a voltage value $V_2$ corresponding to the difference between the set temperature and the outside air temperature, i.e., $V_1+V_2$, with an output voltage $V_3$ from the potentiometer. An output signal voltage $V_4$ obtained by such a comparison is selectively fed to one of the aforesaid pair of solenoids 59a and 59b whereby the air-mix damper is pivotally moved to a position where the output $V_3$ of the potentiometer and the above-mentioned voltage sum, $V_1+V_2$, are balanced.

The operation of the system having the foregoing construction will be explained hereinbelow. For convenience of explanation, the thermo-sensitive resistors are assumed to be thermistors. The output voltage $V_1$ from the amplifier 54, the output voltage $V_2$ from the amplifier 55 and the divided voltage $V_3$ from the potentiometer are balanced as $V_1+V_2=V_3$ in a condition in which the vehicle interior temperature is held at a suitable value. If the vehicle interior temperature rises from this level, the resistance of the vehicle interior temperature detecting thermistor becomes small and the output voltage of the vehicle interior temperature sensor 52 falls, thus increasing the output voltage $V_1$ of the differential amplifier 54, which receives the output voltage of the sensor 52 and that of the temperature setter 53, and resulting in that $V_1+V_2>V_3$. At this moment, the output $V_4$ of the control circuit 57 is fed to the solenoid 59a, which is adapted to pivot the air-mix damper and the arm 58d of the potentiometer 58 to the "Cool" side "B", thereby causing the actuator 59 to be operated. Consequently, the divided voltage $V_3$ of the potentiometer has an increasing value and the proportion of cool air also increases with the movement of the air-mix damper thus lowering the vehicle room temperature until the output $V_1$ of the differential amplifier 54 falls to the balanced state $V_1+V_2=V_3$, whereupon the actuator 59 stops operation.

Conversely, if the vehicle room temperature falls, $V_1$ drops so that $V_1+V_2<V_3$. The air-mix damper and the arm 58d of the potentiometer 58 are pivotally moved to the "Hot" side "A" by means of the other solenoid 59b of the actuator 59 so as to revert to the balanced condition of $V_1+V_2=V_3$ through operations reverse to the foregoing.

As described above, the operation of the air supply fan motor 56 is dependent only on the output voltage $V_1$ of the amplifier 54 and is usually proportional to this voltage $V_1$. Consequently, cool air is not supplied when a change in the outside air temperature requires no supply of cool air, and the noise due to the air supplying operation is favorably reduced.

Moreover, for the air supply fan motor 56, because it is not provided with a speed-change mechanism interlocked with the air-mix damper, it is not required to respond to each pivotal movement of the air-mix damper. Hence, the motor 56 can be adequately operated against changes in the vehicle interior temperature only, thus possibly minimizing the noise.

Furthermore, the output of the vehicle interior temperature sensor 52 and that of the outside air temperature sensor 51 are each independently compared with the output of the temperature setter 53 by means of the separate differential amplifiers 54 and 55, besides the facts that the sum $V_1+V_2$ of respective independent outputs $V_1$, $V_2$ of the amplifiers 54, 55 is compared with the flow-dividing ratio detection output $V_3$ of the air-mix damper. Therefore, minor errors in actual operations of those detection circuits are preferably prevented to the utmost extent from overlapping on the operation of the temperature control system 50.

In the above embodiment, the sum $V_1+V_2$ of the voltage signals based respectively on an output difference between the vehicle room temperature sensor 52 and the temperature setter 53 and that between the outside air temperature sensor 51 and the temperature setter 53 is compared with the flow-dividing ratio detection output voltage $V_3$ of the air-mix damper to obtain the control voltage $V_4$ for the actuator 59. However, a signal obtained by comparison between the outputs $V_1$ and $V_3$ and a signal obtained by comparison between the outputs $V_2$ and $V_3$ may be combined to obtain a control signal for the actuator 59; moreover the outputs $V_1$, $V_2$ and $V_3$ may be converted into pulse signals, which may be processed logically; and furthermore the outputs of the sensors 51, 52, the setter 53, the amplifiers 54, 55 and the controller 57 and the flow-dividing ratio detection output are not limited to being voltage levels. In other words, those outputs may be in the form of analog signals such as electric currents or digital signals such as pulses. The point is that two signals obtained by separately comparing respective outputs of an independently functioning vehicle interior temperature sensor and outside air temperature sensor with an output of a temperature setter, plus flow-dividing ratio detection signals as interlocked with the movement of an air flow dividing device, namely three signals in total, are compared by certain suitable means to obtain a signal for controlling the air flow dividing device. In addition, a signal obtained by comparing an output signal from the vehicle room temperature sensor with that from the temperature setter is used to control an air flow control device.

Referring now to FIG. 4 there is depicted a block diagram showing a modification of the above temperature control system in which a comparative control circuit 67 of a temperature control system 60 integrally includes a differential amplifier portion (not shown) adapted to detect independently a difference between respective outputs of an outside air temperature sensor 61 and a temperature setter 63 and another difference between those of a vehicle interior temperature sensor 62 and the temperature setter 63.

This differential amplifier portion has an output compared in the same manner as in FIG. 3 with an output of a potentiometer 68 interlocked with an air-mix damper 70 to obtain an output signal to be sent via an amplifier 64 to an actuator 69 of the air-mix damper 70. The difference between the outputs of the vehicle interior temperature sensor 62 and the temperature setter 63 is sent from the differential amplifier portion to an air supply fan motor 66 via an amplifier 65.

With the above construction, the functions and advantages of the temperature control system shown in FIG. 3 as further improved by the amplification characteristics of the amplifiers 64 and 65, the characteristics being preferably optional, can afford a temperature control system which effects stable operations according to circumstances. Particularly, by making the amplification characteristic of the motor side amplifier 65 substantially flat at a low voltage range, it becomes possible for a flow-dividing damper alone to adequately operate against small temperature changes.

According to the present invention, as apparent from the foregoing description, a vehicle interior temperature sensor, an outside air temperature sensor and a temperature setting element are disposed independently in parallel, a position detecting element for a flow-dividing damper is provided separately from the temperature setting element, and an air supply fan motor is operated on the basis of the difference between a vehicle interior temperature and a reference temperature, while the flow-dividing damper is operated on the basis of a comparison among the difference between the vehicle interior temperature and the reference temperature, the difference between an outside air temperature and the reference temperature, and an output of the position detecting element, whereby the air supply fan motor and the flow-dividing damper can be adequately operated independently and, according to changes in the vehicle room temperature, selectively operated independently. Particularly, the rotation of the air supply fan is adequately controllable, as the noise is minimized and the driving comfort is greatly improved. Thus, various preferable effects are attainable accoding to this invention.

We claim:

1. An automatic temperature control system for a vehicle air conditioner including a cool air supply mechanism having air flow control means; air flow dividing means for dividing a cool air flow supplied from said cool air supply mechanism into a primary flow and a secondary flow; a heat source for heating said primary flow; and a mixing mechanism for mixing said primary flow as warmed past said heat source and said secondary flow with each other; comprising a first circuit for sensing and outputting as a first signal an air temperature inside a vehicle interior; a second circuit for sensing and outputting as a second signal an air temperature outside said vehicle interior; a third circuit for providing a third signal corresponding to a preset temperature; a fourth circuit interlocked with said air flow dividing means for outputting as a fourth signal the flow-dividing ratio thereof; a fifth circuit for comparing said first signal with said third signal and providing a fifth signal; a sixth circuit for comparing said second signal with said third signal and providing a sixth signal; a seventh circuit for comparing said fourth, fifth and sixth signals with one another and providing a seventh signal to determine the mixing ratio of said primary flow and said secondary flow; said air flow control means being controlled by said fifth signal; and said air flow dividing means being controlled by said seventh signal.

2. A temperature control system according to claim 1, wherein said first, second and third signals are each provided as a voltage level, and said fifth and sixth circuits each comprise a differential amplifier.

3. A temperature control system according to claim 2, wherein said first and second circuits are each provided with a thermistor.

4. A temperature control system according to claim 3, wherein said fourth, fifth and six signals are each provided as a voltage level, and said seventh circuit provides said seventh signal according to a difference between the sum of said voltage levels of said fifth and sixth signals and said voltage level of said fourth signal.

5. A temperature control system according to claim 4, wherein said air flow dividing means comprises an air damper adapted to be operated by a pair of solenoid valves, and said fourth circuit is provided with a potentiometer having a contact piece, said contact piece being adapted to slide in interlocking relation with said air damper.

6. A temperature control system according to claim 5, wherein said pair of solenoid valves are adapted to operate said air damper in directions opposite to each other, and said seventh signal is provided as a voltage level to one of said pair of solenoid valves.

7. A temperature control system according to claim 6, wherein said air flow control means comprises an air supply fan adapted to be operated by an electric motor.

8. A temperature control system according to claims 1, 2, 3, 4, 5, 6 or 7 wherein an amplifier which exhibits a substantially flat amplification characteristic against a relatively small input is provided between said fifth circuit and said air flow control means.

9. In a vehicle air conditioner for automatically controlling the vehicle room temperature including an air supply motor and air-mix damper for changing the mixing ratio of warm air and cool air fed by said motor; a temperature control system comprising a vehicle interior temperature sensor and an outside air temperature sensor and a temperature setting element, which are disposed in parallel, and further an air-mix damper position detecting element provided separately therefrom and interlocked with said air-mix damper, said motor being driven on the basis of an output difference between said temperature setting element and said vehicle interior temperature sensor, and said air-mix damper being operated on the basis of a comparison of the sum of respective output differences between said temperature setting element and said vehicle interior temperature sensor and between said temperature setting element and said outside air temperature sensor with an output of said air-mix damper position detecting element.

10. A temperature control system according to claim 9, wherein said vehicle interior temperature sensor and said outside air temperature sensor are provided with thermistors, and separate differential amplifiers are provided for comparing respective outputs of said thermistors with an output of said temperature setting element.

* * * * *